United States Patent [19]
Wolcott et al.

[11] 3,730,628
[45] May 1, 1973

[54] ELECTRONIC DISTANCE MEASURING METHOD AND APPARATUS

[75] Inventors: John R. Wolcott; MacDonald J. Wiggins, both of Orlando, Fla.

[73] Assignee: Martin Marietta Corporation, New York, N.Y.

[22] Filed: Dec. 16, 1970

[21] Appl. No.: 98,778

[52] U.S. Cl...................356/5, 343/7.5, 343/12 R, 343/14, 343/17.5
[51] Int. Cl............................G01c 3/08, G01s 9/23
[58] Field of Search.................356/5; 343/7.5, 12 R, 343/14, 17.5

[56] References Cited

UNITED STATES PATENTS

| | | | |
|---|---|---|---|
| 3,652,161 | 3/1972 | Ross | 356/5 |
| 3,522,992 | 8/1970 | Jaffe | 343/14 |
| 3,508,828 | 4/1970 | Froome et al. | 356/5 |
| 3,191,171 | 6/1965 | Zuefeldt et al. | 343/12 R |
| 3,298,024 | 1/1967 | Bohm | 343/12 R |
| 3,430,237 | 2/1969 | Allen | 343/7.5 |
| 3,305,861 | 2/1967 | Webb | 343/7.5 |

Primary Examiner—Benjamin A. Borchelt
Assistant Examiner—S. C. Buczinski
Attorney—Julian C. Renfro and Gay Chin

[57] ABSTRACT

An electronic distance measuring device and method for determining the distance between two locations utilizing electromagnetic or light wave energy. The wave energy is transmitted from one location to the other and is reflected back toward the transmitting location. The reflected energy is detected and compared in phase with the transmitted energy, and the phase relationship between the transmitted and detected energy varied until a predetermined phase relationship exists. The predetermined phase relationship is selected so that the wave energy along the path between the transmitter, reflector and detector contains an integral number of wavelengths of wave energy. A time gate related to the propagation of the wave energy along this path is generated and distance is displayed digitally in response to the time gate and a highly stable reference frequency signal.

25 Claims, 3 Drawing Figures

INVENTORS
JOHN R. WOLCOTT
MACDONALD J. WIGGINS

ATTORNEY

FIG. 3

ELECTRONIC DISTANCE MEASURING METHOD
AND APPARATUS

BACKGROUND OF THE INVENTION

The present invention relates to electronic distance measuring systems and more specifically to a method and apparatus for making extremely accurate distance measurements between two predetermined geographical locations utilizing electromagnetic or light wave energy.

When surveying or otherwise measuring distances which need to be determined with extreme accuracy, it is often very difficult or even impossible to measure the distances in a conventional manner, e.g., by "chaining." When "chaining," distance is measured by a screw of from four to six people in short increments using a metallic chain or tape. Depending on the terrain, it may be necessary to compensate for uneven ground and, in fact, it may be impossible to make a direct measurement due to deep canyons or bodies of water. In addition, when "chaining," compensation must be made for variations in temperature, moisture and tape tension. In addition to being slow, this "chaining" method of surveying requires great skill and involves numerous calculations which must be repeatedly checked to avoid errors. Thus, where substantial distance measurements are involved, this method may be quite impractical.

Electronic distance measuring systems have been developed to alleviate the problems associated with "chaining." For example, one known electronic distance measuring device transmits electromagnetic wave energy toward a target and detects the reflected energy. The phase difference between the transmitted and reflected energy is determined and the phase difference is utilized to calculate distance through the use of the following equation:

$$d = nc/2f \qquad 1$$

Where: $d$ is distance, $c$ is the speed of light, $f$ is the frequency of the transmitted wave energy, and $n$ is the number of wavelengths contained in the transmitted and reflected beam.

The distance $d$ calculated through the use of the above equation is limited in accuracy to the accuracy of the measurement of $n$, i.e., the number of integral and fractional wavelengths in the transmitted and reflected beam of wave energy. The fractional portion of the number $n$ is readily calculated from the measured phase difference. For example, assuming that the transmitted frequency is 1 megahertz and the above described phase comparison results in an indication of a 60° phase difference between the transmitted and reflected wave energy, the fractional portion of the number $n$ is 60/360 or one-sixth of a wavelength.

However, the ambiguity with respect to the integral number of wavelengths must still be resolved. To eliminate the range ambiguity in this type of phase comparison system, a number of phase comparisons and phase difference measurements are obtained at various known frequencies. Elimination of the range ambiguity in this manner may add greatly to the size, the number of components and the expense of the electronic distance measuring device. In addition, since the exact phase difference between the transmitted and reflected wave energy must be measured in order to provide the accuracy required in surveying applications, an extremely accurate phase shifter or time delay must be provided. This adds to the expense of the system and is an additional possible source of error. Furthermore, since the frequency of the transmitted signal is used in calculating the distance, the transmitter must be very stable.

Another approach to the range ambiguity problem is disclosed and claimed in the copending application to John R. Wolcott, filed Dec. 18, 1970, Ser. No. 99,560, and entitled "Electronic Distance Measuring Device and Method." and assigned to the assignee of the present invention.

In the referenced Wolcott application, the frequency of the transmitted signal is adjusted to achieve a predetermined phase relationship between the transmitted and reflected signals. The adjustment of the frequency of the transmitted signal until the same phase relationship exists at a second frequency will result in the addition of an integral number, e.g. one, of quarter wavelengths of the transmitted wave energy. The difference in the frequencies of the transmitted wave energy may then be utilized to provide a direct readout of the distance. To obviate the measurement or storage of the frequency of the transmitted signal, it is necessary to utilize two oscillators and to perform a subtraction or heterodyning of the two oscillator output signals.

Another known electronic distance measuring technique is the use of the radar principle which measures distance to a target by determining the time delay between a transmitted electromagnetic wave and the reception at the transmission point of the wave reflected from the target. It is common to transmit pulses or bursts of energy and to utilize the sharp rise or fall times of the pulse in making the required time measurement. While this technique is relatively simple, it is not sufficiently accurate for applications such as surveying, due to the difficulty of identifying precisely the time of arrival of the received reflected signal.

However, it has been found that a distance measurement made by the radar technique is sufficiently accurate to determine the integral number of wavelengths in the transmitted and reflected beam where the transmitted frequency is less than a certain value.

This invention uses a combination of the highly accurate phase measurement technique in combination with the less accurate radar technique, using the radar technique to remove the ambiguity with respect to the integral number of wavelengths involved in the phase measurement, to achieve a highly accurate distance measuring device and method having less complexity and lower costs than prior art devices.

It is therefore a primary object of the present invention to obviate the necessity for the second oscillator in a distance measuring system of the electronic type.

It is another object of the present invention to provide a novel method and apparatus for accurately and rapidly measuring and displaying distances electronically.

It is yet another object of the present invention to provide a novel method and apparatus for resolving range ambiguities associated with electronic distance measuring devices.

It is a further object of the present invention to provide a novel electronic distance measuring method and apparatus wherein the transmitted and reflected wave energy is phase locked to facilitate the resolution of range ambiguity, by the radar technique.

It is yet a further object of the present invention to provide a novel electronic distance measuring method and apparatus wherein the frequency of the transmitted wave energy need not be known or determined.

It is still a further object of the present invention to provide a novel electronic distance measuring method and apparatus wherein a digital display of distance is provided.

These and other objects and advantages of the present invention will become apparent to one skilled in the art to which the invention pertains from a perusal of the appended claims and the detailed description when read in conjunction with the attached drawings.

DETAILED DESCRIPTION

Figure 1:
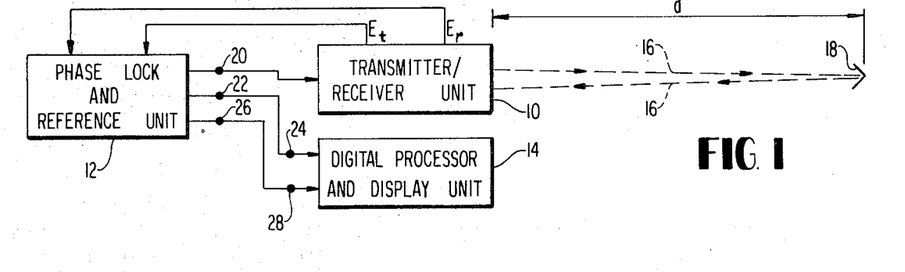
FIG. 1 is a general functional block diagram of the system of the present invention.

The electronic distance measuring system of the present invention is illustrated functionally in the block diagram of FIG. 1. The system generally comprises a transmitter/receiver unit 10, a phase lock and reference unit 12 and a digital processor and display unit 14.

The transmitter/receiver unit 10 may be any conventional transmitter/receiver unit capable of providing a beam 16 of wave energy, e.g., light or electromagnetic wave energy. The beam 16 may be directed toward a target 18 which reflects the beam 16 back toward the transmitter/receiver 10 where the reflected beam is detected in a conventional manner, for example, by a photo detector or appropriate antenna.

A signal $E_t$ related in frequency and phase to the transmitted wave energy and a signal $E_r$ related in frequency and phase to the received wave energy are applied to the phase lock and reference unit 12 hereinafter described in connection with FIGS. 2–4. The phase lock and reference unit 12 compares the phase of the signal $E_t$ to the phase of the signal $E_r$ and generates a signal which is related to the phase difference therebetween.

The signal related to the phase difference may then be utilized to either automatically vary the phase relationship between the transmitted and received signals until a predetermined relationship exists or to provide an indication of the phase relationship to thereby permit manual variation of the phase relationship until the desired predetermined relationship exists. The phase relationship may be varied, for example, by applying a signal from an output terminal 20 of the phase lock and reference unit 12 to the transmitter/receiver unit 10 to vary the frequency of the transmitted signal or alternatively to vary the frequency of a modulating signal superimposed on the transmitted signal until a comparison between the signals $E_t$ and $E_r$ indicates that the desired predetermined phase relationship exists between the transmitted signals or the modulation signals superimposed on the transmitted carrier. This desired phase relationship may conveniently be 0° phase difference so that an integral number of wavelengths of energy exist in the transmitted and reflected beam 16.

After phase locking the transmitted and received wave energy at a frequency $f_1$ which provides an integral number of full, half or quarter wavelengths of wave energy in the beam 16, a time period T related in duration to the number of full, half or quarter wavelengths contained in the beam is established by interrupting the beam 16 and counting the number of wavelengths between the detection of the trailing edge of the interrupted transmitted wave energy and the trailing edge of the interrupted received wave energy. The phase lock and reference unit 12 utilizes this count to generate a gating signal related in duration to this time period T.

This gating signal is applied from an output terminal 22 of the phase lock reference unit 12 to an input terminal 24 of the digital processor and display unit 14. In addition, the phase lock and reference unit 12 provides an extremely accurate and highly stable reference signal $f_o$ at an output terminal 26 which is applied to the digital processor and display unit 14 via an input terminal 28. As will subsequently be described in greater detail, the gating signal and the reference signal are then utilized to provide a digital readout of distance. Since the fractional portion of the number n of Equation (1) is eliminated, this readout is highly accurate.

Figure 2:
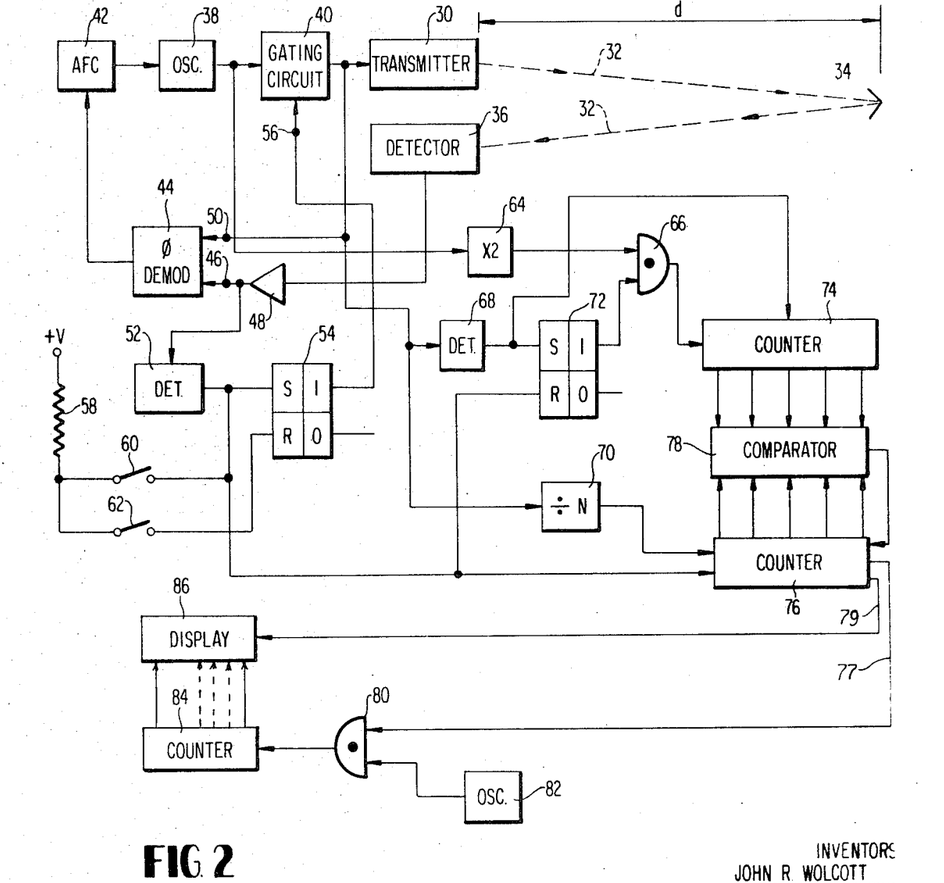
FIG. 2 is a detailed functional block diagram of one embodiment of the electronic distance measuring system of FIG. 1; and, FIG. 3 is a detailed functional block diagram of a second embodiment of the electronic distance measuring system of FIG. 1.
Figure 3:
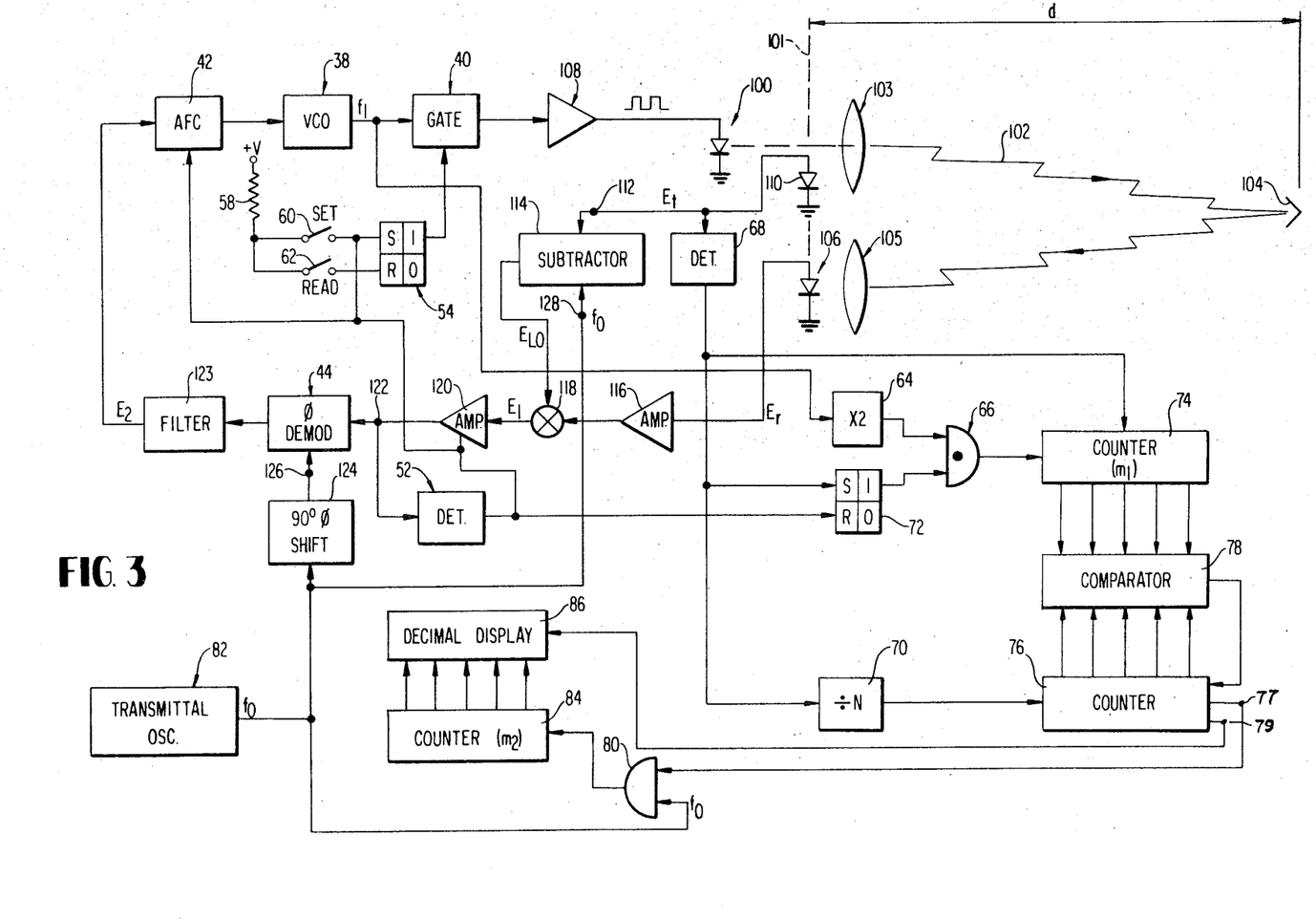

The operation of the electronic distance measuring system of FIG. 1 may be more fully understood from the following general, theoretical system description and, thereafter, a more specific description of the embodiments illustrated in FIGS. 2 and 3.

With continued reference to FIG. 1, the signals $E_t$ and $E_r$ may be expressed by the following equations:

$$E_t = A_t \sin 2\pi f_1 t \qquad 2$$

$$E_r = A_r \sin 2\pi f_1 (t - 2d/c) \qquad 3$$

Where:
$A_t$ is the amplitude of the transmitted wave energy;
$A_r$ is the amplitude of the received wave energy;
$f_1$ is the frequency of the transmitted and received wave energy;
$d$ is the distance from the transmitter/receiver unit to the reflector; and,
$c$ is the speed of light.

Selecting the initial phase lock between the transmitted and received wave energy at a predetermined angular phase difference of 180° or ½ wavelength difference, the phase difference between the signals $E_t$ and $E_r$ may be represented as $2\pi f_1(2d/c)$ and may be equated to an integral number of half wavelengths. For example, if phase lock occurs at every half wavelength, the phase difference may be expressed as:

$$2\pi f_1(2d/c) = M\pi \qquad 4$$

$$\text{and } M = 4f_1 d/c \qquad 5$$

Where M is any integer.

By interrupting the transmission of wave energy and detecting the trailing edge of the transmitted and received wave energy, a time period $T$ given by the following equation is established:

$$T = (2d)/c \qquad 6$$

If the frequency of the transmitted wave energy is doubled and counted during the time period T, the count $m_1$ is given by the equation:

$$m_1 = T(2f_1) = 4f_1 d/c = M \qquad 7$$

Thus, the count at the end of the period T is equal to the number of half wave-lengths in the beam 16.

By again counting the wavelengths or cycles of the transmitted wave energy divided by an appropriate constant N and comparing this count to the count $m_1$, a gating signal having a time duration $T_1$ given by the following equation is established:

$$T_1 = Nm_1/f_1 = NM/f_1 = (N)4d/c \qquad 8$$

Allowing a counter to count the cycles of the reference signal having a frequency $f_o$ for the duration of $T_1$, the count $m_2$ in the counter is given by the equation:

$$m_2 = T_1 f_o = 4d f_o N/c \qquad 9$$

By selecting $N = c/4f_o$, the count $m_2$ provides a direct readout of the distance d in terms of the units selected for c. Thus, the count $m_2$ equals the distance d.

An embodiment of the electronic distance measuring system of the present invention is illustrated in greater detail in the functional block diagram of FIG. 2.

Referring now to FIG. 2, a conventional, continuous wave transmitter 30 provides a beam 32 of wave energy, e.g. light or other electromagnetic wave energy, which is directed toward a target 34 and reflected back toward the transmitter 30 for detection by a suitable conventional detector 36.

The beam 32 of wave energy from the transmitter 30 may be amplitude modulated in a conventional manner by the output signal from a variable frequency oscillator 38 applied to the transmitter 30 through a conventional electronic gating or switching circuit 40. The detector 36 detects the amplitude modulation of the reflected wave energy and thus provides an output signal which is related in frequency to the frequency of the output signal from the oscillator 38, and which is related in phase both to the phase of the oscillator 38 signal and to the distance between the transmitter 30 and the target 34.

The frequency of the output signal from the oscillator 38 is controlled in accordance with the output signal from a conventional automatic frequency control (AFC) circuit 42 which provides a frequency control signal in response to the output signal from a conventional phase demodulator or comparator 44. For example, the oscillator 38 may be a voltage controlled oscillator the output signal from which varies in frequency in response to the application of a d.c. potential generated by the AFC circuit 42 in response to the output signal from the phase demodulator 44. The phase demodulator 44 may be of the type which provides a d.c. voltage related in magnitude and polarity to the deviation of the phase difference between two input signals from a predetermined phase difference.

The beam 32 of wave energy reflected from the target 34 is demodulated by the detector 36 and the detected amplitude modulation signal from the detector 36 is applied to one input terminal 46 of the phase demodulator 44 by way of a conventional signal amplifier 48. The output signal from the gating circuit 40, i.e. the output signal from the oscillator 38, is applied to a second input terminal 50 of the phase demodulator 44.

In operation, the output signal from the oscillator 38 modulates the carrier generated by the transmitter 30 when the gate 40 is enabled. The amplitude modulated beam 32 of wave energy is transmitted toward the target 34 and is reflected back toward the detector 36 where the amplitude modulation is detected. The detector 36 provides an output signal related in frequency and phase to the detected modulation and this signal is amplified by the amplifier 48 and is compared in phase to the output signal from the oscillator 38 in the phase demodulator comparator 44.

The phase demodulator 44 provides a d.c. output signal related in magnitude and polarity to the deviation of the phase difference between the two input signals applied thereto from a predetermined phase relationship. For example, assuming that the phase demodulator 44 is a conventional half wavelength phase demodulator or comparator, the output signal therefrom is zero volts when the phase difference between the two input signals is exactly one half wavelength, i.e. $M\pi$ wavelengths were M equals any integer. Thus, for example, if the phase difference between the input signals to the phase demodulator 44 is greater than the above predetermined phase relationship of one half wavelength, e.g. 190°, the output signal from the phase demodulator 44 is a positive d.c. potential. If the phase difference between these input signals is less than the predetermined phase relationship, e.g. 170°, the output signal from the phase demodulator 44 is a negative d.c. potential.

The automatic frequency control circuit 42 varies the frequency of the oscillator 38 in accordance with the d.c. signal from the phase demodulator 44 until the predetermined phase relationship established by the phase demodulator 44 exists between the output signal from the oscillator 38 and the output signal from the detector 36, i.e. between the transmitted and received signals. Thus, a phase responsive, closed loop is established and the output signal from the oscillator 38 is locked at a frequency which provides, for example, an integral number of half wavelengths of wave energy in the beam 32 over the distance from the transmitter 10 to the target 34 and back to the detector 36.

With continued reference to FIG. 2, the output signal from the amplifier 48 is applied to a suitable conventional detector 52 which is operable to provide an output signal in response to the absence of an output signal from the amplifier 48. The output signal from the detector 52 is applied to a conventional bistable multivibrator or flipflop 54 and the binary ONE output signal therefrom is applied to an input terminal 56 of the gating circuit 40. A positive d.c. potential (+V) is applied through a resistor 58 to the normally open contacts of a "SET" switch 60 and a "READ" switch 62, which are connected, respectively, to the set input terminal and the reset input terminal of the flipflop 54.

The output signal from the oscillator 38 is applied through a conventional times-two frequency multiplier 64 to one input terminal of a two input terminal AND gate 66. The output signal from the gating circuit 40 is applied to a detector 68 which may be identical to the detector 52 previously described, and to a divide by N divider or counter 70. The output signal from the detector 68 is applied to the set input terminal of a conventional bistable multivibrator or flipflop 72 and to the reset input terminal of a conventional counter 74. The output signal from the detector 52 (and the switch 60) is applied to the reset input terminal of the flipflop 72 and to the reset input terminal of a conventional counter 76. The binary ONE output signal from the flipflop 72 is applied to the second input terminal of the AND gate 66 and the output signal from the AND gate 66 is applied to the trigger or clock input terminal of the counter 74.

The output signal from the divide by N divider 70 is applied to the trigger or clock input terminal of the counter 76 and output signals representative of the total count in the counter 76 are applied to a suitable, conventional digital comparator 78. Output signals representative of the count in the counter 74 are applied to the comparator 78 and, when the count in the counter 76 is equal to the count in the counter 74, an output signal is generated by the comparator 78 and applied to the reset input terminal of the counter 76.

The output signal from the output terminal 77 of the counter 76 is thus related in duration to the time interval between the counting of a first input pulse by the counter 76 and the resetting of the counter 76 by the comparator 78. This signal is applied to one input terminal of a two input terminal AND gate 80. The output signal from a conventional, highly stable oscillator 82, e.g. crystal controlled, is applied to the other input terminal of the AND gate 80 and the signal from the AND gate 80 is applied to the trigger or clock input terminal of a conventional counter 84. An output signal from the counter 84 is applied to a conventional display device 86. In addition, when the counter 76 is reset by the comparator 78 an output signal therefrom is generated and applied via an output terminal 79 to the display device 86 to transfer the count in the counter 84 to the display device 86 at the same time that the counter 76 is reset.

In operation, the "SET" switch 60 is closed to set the flipflop 54 and thus enable the gating circuit 40, to reset the flipflop 72 and thus inhibit the AND gate 66, and to reset the counter 74 to zero. The signal from the oscillator 38 is applied to the transmitter 30 via the enabled gating circuit 40 to amplitude modulate the beam 32 of wave energy. The phase responsive closed loop previously discussed operates to vary the frequency of the oscillator 38 signal until the beam 32 of wave energy contains an integral number of half-wavelengths.

The transmitted modulation or the signal from the oscillator 38 may be given by the equation (2). The received or detected modulation, i.e. the signal from the detector 36, may be given by the equation (3).

Since the beam 32 of wave energy contains an integral number of half-wavelengths, the phase difference between the transmitted and detected modulation signals is given by the equation (4).

The "READ" switch 62 is then actuated and the flipflop 54 is reset, inhibiting the gating circuit 40. The trailing edge of the modulating signal from the oscillator 38 is detected by the detector 68 and the flipflop 72 is set and the counter 74 reset responsively thereto. The setting of the flipflop 72 enables the AND gate 66 and the signal from the oscillator 38 multiplied by two by the multiplier 64 is applied through the AND gate 66 to the counter 74.

As indicated in equation (6), the time delay T is equal to the distance to and from the target divided by the propagation speed of the wave energy. After the time delay T, the trailing edge of the received modulation signal is detected by the detector 52 and the flipflop 54 is set and the flipflop 72 is reset. The gating circuit 40 is thus enabled and the AND gate 66 is inhibited. In addition, the counter 76 is reset by the detected trailing edge of the received modulation signal.

Having counted the multiplied frequency of the signal from the oscillator 38 for the time period T, the count $m_1$ stored in the counter 74 at the end of the time period T is equal to the total number of cycles or wavelengths contained in the beam 72 and is given by the equation (7). Since the gating circuit 40 is enabled when the trailing edge of the detected modulation signal is received, the signal from the oscillator 38 is applied to the counter 76 via the divide by N divider 70 and the counter 76 counts at the rate equal to $f_1/N$. The signal applied to the one input terminal of the AND gate 80 from the counter 76 is a pulse which assumes a high signal level when the counter 76 starts to count and which assumes a low signal level when the counter 76 is reset by the comparator 78. Since the counter 76 is reset when the count therein equals the count $m_1$ stored in the counter 74, the time duration $T_1$ of the pulse generated by the counter 76 and provided at the output terminal 77 is given by equation (8).

Thus, by applying the signal from the reference oscillator 82 to the counter 84 for the period of time $T_1$ (i.e. by gating the signal from the oscillator 82 through the AND gate 80 for a period of time determined by the signal from the output terminal 77 of the counter 76), the counter $m_2$ in the counter 84 is given by equation (9). The value of N of equation (9) may be $c/4f_o$. Thus, equation (9) reduces to $m_2 = d$ and the distance between the two predetermined locations (i.e. between the transmitter and the target) may be displayed digitally by the display device 86.

Another embodiment of the electronic distance measuring system of the present invention is illustrated in detail in the functional block diagram of FIG. 3 wherein elements which are like those described in connection with FIG. 2 have been given like numerical designations.

With reference now to FIG. 3, a conventional transmitter 100, such as a solid state gallium arsenide laser having a grounded cathode electrode, provides a beam 102 of light wave energy which is directed through a suitable lens system 103 toward a target 104, i.e. an optical corner reflector. The beam 102 of light wave energy is reflected back toward the location of the transmitter and is there focused through a suitable lens system 105 detected by a suitable conventional detector 106, e.g. a grounded cathode electrode, silicon photo diode.

The beam 102 of light wave energy may be amplitude modulated by applying the output signal $f_1$ from a suitable conventional variable frequency oscillator 38, e.g. a voltage controlled oscillator, to the anode electrode of the laser 100 through an electronically controlled gating circuit 40 and a suitable conventional driver amplifier 108.

The amplitude modulation signal may be detected at the transmitter by a suitable conventional detector 110, e.g. a grounded cathode silicon photo diode, and the output signal $E_t$ from the detector 110 may be applied directly to an input terminal 112 of a suitable conventional frequency subtractor. The signal from the detector 106 may also be applied through a suitable detector circuit 68 to the set input terminal of a bistable multivibrator or flipflop 72 and to the reset input terminal of a conventional digital counter 74.

The detector 106 detects the amplitude modulation of the reflected wave energy and provides an output signal $E_r$ related in frequency to the frequency of the output signal from the oscillator 38 and related in phase both to the phase of the oscillator 38 and to the distance between the laser 100 and the reflector 104. The output signal from the detector 106 is applied through a conventional signal amplifier 116 to one input terminal of a conventional frequency mixer 118 and the output signal from the subtractor circuit 114 is applied to a second input terminal of the mixer 118.

The output signal from the mixer 118 is applied through a conventional high gain, narrow band width amplifier 120 to one input terminal 122 of a conventional phase demodulator circuit 44 and to a suitable detector 52. The output signal from the phase demodulator circuit 44 is applied through a suitable conventional low pass filter 123 to a conventional automatic frequency control circuit 42, the output signal from which is applied to the oscillator 38.

The output signal $f_o$ from a conventional highly stable oscillator, e.g. a crystal controlled oscillator 82 is applied through a phase shifting circuit 124 to a second input terminal 126 of the phase demodulator 44. The output signal from the oscillator 82 is also applied to a second input terminal 128 of the subtractor circuit 114.

In operation, the output signal from the oscillator 38 modulates the carrier wave generated by the gallium arsenide laser 100 when the gating circuit 40 is enabled. The amplitude modulated beam 102 of light wave energy is transmitted toward the reflector 104 and is reflected toward the detector 106 where the amplitude modulation is detected. In addition, the amplitude modulation signal transmitted from the laser 100 is sampled by the detector 110 to provide the reference signal $E_t$. The signals $E_t$ and $E_r$ from the detectors 110 and 106, respectively, may be given by equations (2) and (3) previously discussed.

The signal $E_t$, together with the signal from the oscillator 82, is applied to the subtractor circuit 114 and a difference signal $E_{LO}$ generated. For example, the subtractor circuit may comprise a mixer and a filter which heterodyne the signals to obtain the signals $f_1, f_o, f_o + f_1$ and $f_o - f_1$, and then filter the signals to pass only the signal $f_o - f_1$. The output signal $E_{LO}$ may be expressed by the following equation:

$$E_{LO} = A_{LO} \sin 2\pi(f_o - f_1)t \qquad 10$$

The signal $E_{LO}$ is applied to the mixer 118 and there mixed with the amplified signal $E_r$. The output signal $E_1$ from the mixer 118 is given by the following equation:

$$E_1 = A_1 \cos 2\pi(f_o t - 2f_1 d/c) \qquad 11$$

The signal $E_1$ is applied through the amplifier 120 to the phase demodulator 44 and is there compared with the signal from the oscillator 82 which has been phase shifted by 90°. The phase demodulator 44 provides an output signal $E_2$ which, after filtering, is given by the following equation:

$$E_2 = A_2 \sin 4\pi f_1 d/c \qquad 12$$

The signal $E_2$ is applied to the automatic frequency control circuit 42 to control the frequency of the variable frequency oscillator 108. The automatic frequency control circuit 42 is designed so that it provides an output signal which varies the frequency of the oscillator 108 until the value of the signal $E_2$ is at or near zero, i.e. until $4\pi f_1 d/c = M\pi$ where $M$ is either an odd or even integer depending on the relationship between the polarity of the input and output signals of the AFC circuit 42.

The above described system provides a phase responsive, closed loop transmitter/receiver which is phase locked at a frequency which provides, for example, an even integral number of half wavelengths of wave energy in the beam 102 over the distance from the detector 110 to the reflector 104 and back to the detector 106. The amplifier 116 is selected such that very little or at least a constant time delay is introduced therein and the use of the signal from the crystal oscillator 82 as a local oscillator signal permits the use of the high gain, narrow band width amplifier 120, having a bandwidth centered at the local oscillator frequency. This prevents non-constant time delays over the operating frequency range of the oscillator 38 which might normally be introduced if the high gain amplifier 120 did not operate at a constant frequency.

In addition, the detector 110 is utilized to provide the signal $E_t$ rather than taking the signal directly from the oscillator 38. This eliminates any phase errors due to the phase shifts in the modulation of the galium arsenide laser. Since most causes of possible phase errors are eliminated and those remaining are kept constant, any phase errors introduced by the system may be compensated for by varying the relative positions of the detectors 106 and 110, i.e. by offsetting one of the detectors 106 and 110 in a direction perpendicular to the line 101 sufficient to compensate for unwanted phase errors.

The above described phase responsive closed loop transmitter/receiver establishes an integral number of half-wavelengths in the beam 102 of light wave energy (see equation (5)).

Control of the gating circuit 40 and digital display of distance may be identical to that described in connection with FIG. 2, with the exception that the output signal from the detector 52 may be applied to the automatic frequency control circuit 42 to hold the frequency of the output signal from the oscillator 38 at the value determined by the phase responsive, closed loop system during the inhibiting of the signal from the oscillator 38, and may also be applied to the amplifier 120 for use as an automatic gain control signal in addition to being applied to the set input terminal of the flipflop 54. Thus, since the gating control circuitry and the display circuitry may be functionally identical to that of FIG. 2, this circuitry will not be here described in detail.

The present invention may thus be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for measuring the distance between two predetermined locations comprising:
   means for transmitting wave energy from one of the predetermined locations toward the other of the predetermined locations,
   means at said one of the predetermined locations for detecting the phase of the wave energy reflected from said other of the predetermined locations,
   means for selectively modifying the frequency-phase relationship between said transmitted and detected wave energy to obtain an integral number of one-half wavelengths of the transmitted and reflected wave energy between said two predetermined locations,
   means for establishing a time interval related to the propagation time of the wave energy and the distance between the two locations,
   means for utilizing the time interval thus established for determining a count of the exact integral number of such one-half wavelengths of the transmitted and reflected wave energy between the two predetermined locations, and
   means for indicating such count, thus to represent the distance between the two predetermined locations responsively to the time interval established.

2. The apparatus of claim 1 wherein said means for selectively modifying the frequency-phase relationship between said transmitted and detected wave energy includes means for varying the frequency of the transmitted wave energy.

3. The apparatus of claim 1 wherein said means for indicating the count includes:
   means for generating an electrical reference signal having a predetermined frequency, and,
   means for counting the number of cycles of said reference signal during the established time interval.

4. The apparatus of claim 1 wherein said transmitting means includes:
   means for generating a continuous wave carrier beam of wave energy; and,
   modulator means for amplitude modulating said continuous wave carrier beam of wave energy responsively to an applied modulating signal.

5. The apparatus of claim 4 wherein said means for detecting the wave energy comprises detector means for detecting the amplitude modulation of said continuous wave carrier beam.

6. The apparatus of claim 5 wherein said time interval establishing means includes:
   means for marking the transmitted wave energy;
   means for detecting the marking of the transmitted wave energy; and,
   means for establishing a time interval related to the detection of the marking of the transmitted wave energy and the detection of the mark in the reflected wave energy by said phase detecting means.

7. The apparatus of claim 6 wherein said means for modifying the phase relationship between said transmitted and detected wave energy includes:
   means for comparing the phase of the applied modulating signal with the phase of said detected amplitude modulation; and,
   means for modifying the frequency of the applied modulating signal responsively to the operation of said comparing means.

8. The apparatus of claim 1 wherein said time interval establishing means includes:
   means for marking the transmitted wave energy;
   means for detecting the marking of the transmitted wave energy; and,
   means for establishing a time interval related to the detection of the marking of the transmitted wave energy and the detection of the mark in the reflected wave energy by said phase detecting means.

9. The apparatus of claim 8 wherein said means for selectively modifying the phase relationship between said transmitted and detected wave energy includes means for varying the frequency of the transmitted wave energy.

10. Apparatus for measuring the distance between two predetermined locations comprising:
    means for transmitting wave energy from one of the predetermined locations toward the other of the predetermined locations;
    means at said one of the predetermined locations for detecting the wave energy reflected from said other of the predetermined locations;
    means for generating a first electrical signal related to the phase difference between the transmitted wave energy and the reflected wave energy;
    means for varying the frequency of the transmitted wave energy to thereby modify the phase relationship between the transmitted wave energy and the reflected wave energy to obtain an integral number of one-half wavelengths between said two locations;
    means for determining the number of one-half wavelengths of the wave energy between said two locations; and
    means for indicating the distance between said two predetermined locations responsively to the frequency of the transmitted wave energy and the number of one-half wavelengths counted.

11. A method for measuring the distance between two predetermined locations comprising the steps of:
    transmitting wave energy from one of the predetermined locations toward the other of the predetermined locations,
    detecting at said one of the predetermined locations the wave energy reflected from said other of the predetermined locations, varying the frequency of the transmitted wave energy to obtain an integral number of one-half cycles of wave energy between the two locations, determining the number of one-half cycles of wave energy between the two locations, establishing a time interval related in duration to the propagation velocity of the wave energy and the number of one-half cycles counted, and, indicating the distance between the two predetermined locations responsively to the established number of one-half cycles of wave energy between the two locations.

12. The method of claim 11 wherein the time interval is established by:

interrupting the transmission of wave energy;

detecting the interruption of the transmitted wave energy in reflected wave energy;

establishing a digital count related to the frequency of the transmitted wave energy and the interval between the interrupted transmitted wave energy and the detection thereof in the reflected wave energy; and, generating a gating signal related in duration to the frequency of the transmitted wave energy and the digital count.

13. The method of claim 12 including the steps of:

generating a reference signal having a predetermined fixed frequency;

counting the number of cycles of the reference signal for the duration of the gating signal; and, displaying the number of cycles counted.

14. The method of claim 13 wherein the step of varying the frequency of the transmitted wave energy includes the steps of:

comparing the phase of the transmitted wave energy with the phase of the detected wave energy; and, varying the frequency of the transmitted wave energy responsively to the phase comparison.

15. The method of claim 11 wherein the step of varying the frequency of the transmitted wave energy includes the steps of:

comparing the phase of the transmitted wave energy with the phase of the detected wave energy; and, varying the frequency of the transmitted wave energy responsively to the phase comparison.

16. A method for measuring the distance between two predetermined locations comprising the steps of:

transmitting wave energy from one of the predetermined locations toward the other of the predetermined locations;

detecting at said one of the predetermined locations the wave energy reflected from said other of the predetermined locations;

detecting the phase difference between the transmitted and reflected wave energy;

modifying the frequency-phase relationship between the transmitted and the detected wave energy to obtain a predetermined phase relationship between the transmitted and detected wave energy;

counting the number of complete wavelengths of the wave energy between the two locations; and, indicating the distance between the two predetermined locations responsively to the transmitted wave energy and the number of wavelengths.

17. Apparatus for measuring the distance between two geographically separated locations comprising:

means for transmitting wave energy from a first of the locations toward a second of the locations, means for detecting the wave energy reflected back from the second location to the first location, means at the first location for determining the phase of such wave energy reflected back from the second location relative to the phase of the transmitted wave energy, means for selectively modifying the frequency-phase relationship between the transmitted and the reflected wave energy to obtain an integral number of one-half wavelengths of the transmitted and reflected wave energy between the two locations, means for determining the frequency of the transmitted wave energy, means for establishing a time interval related to the propagation time of the wave energy between the two locations, and means for utilizing the time interval and the frequency of the transmitted wave energy thus established, for determining the number of half wavelengths between the two locations, such number of half wavelengths being directly proportional to the distance between the two locations.

18. The apparatus as defined in claim 17 in which said means for establishing a time interval involves means for interrupting the transmitted wave energy, and thereafter determining the time delay of the manifestation of such interruption in the reflected wave energy.

19. The apparatus of claim 17 wherein means for indicating a distance readout is utilized, said means including:

means for generating an electrical reference signal having a predetermined frequency, and, means for counting the number of cycles of said reference signal during the established time interval.

20. The apparatus of claim 17 wherein said transmitting means includes:

means for generating a continuous wave carrier beam of wave energy, and, modulator means for amplitude modulating said continuous wave carrier beam of wave energy responsively to an applied modulating signal.

21. The apparatus of claim 20 wherein said means for detecting the wave energy comprises detector means for detecting the amplitude modulation of said continuous wave carrier beam.

22. The apparatus of claim 21 wherein said time interval establishing means includes:

means for marking the transmitted wave energy, means for detecting the marking of the transmitted wave energy, and, means for establishing a time interval related to the detection of the marking of the transmitted wave energy and the detection of the mark in the reflected wave energy by said phase detecting means.

23. The apparatus of claim 21 wherein said means for modifying the frequency-phase relationship between said transmitted and reflected wave energy includes:

means for comparing the phase of the applied modulating signal with the phase of said detected amplitude modulation, and, means for modifying the frequency of the applied modulating signal responsively to the operation of said comparing means.

24. Apparatus for measuring the distance between two geographically separated locations comprising:
   means for transmitting wave energy from one of the locations towards the other of the locations,
   means at the one location for detecting relative to the transmitted wave energy, the phase of the wave energy reflected back from the other location,
   means for selectively modifying the frequency-phase relatiomship between the transmitted and the reflected wave energy to obtain an integral number of one-half wavelengths of the transmitted and reflected wave energy between the two locations,
   means for establishing a time interval related to the propagation time of the wave energy between the two locations,
   means utilizing the time interval thus established for determining the number of half wavelengths between the two locations, where such number of half wavelengths is directly proportional to the distance between the two locations,
   means for establishing a second time interval proportional to the distance between locations, latter means including means for dividing and counting the transmitted frequency until a count equal to the number of half wavelengths is obtained,
   means for applying the second time interval to a stable oscillator and for counting the number of stable oscillator cycles in such time interval, and
   means for displaying such count of stable oscillator cycles, to serve as an accurate readout of distance.

25. Apparatus for measuring the distance between two geographically spaced locations comprising:
   means for transmitting wave energy from one of the locations toward the other of the locations,
   means at the one location for detecting the phase of the wave energy reflected from the other location,
   means for selectively modifying the frequency-phase relationship between the transmitted and detected wave energy to obtain an integral number of half wavelengths of the transmitted and reflected wave energy between the two locations,
   means for counting the integral number of half wavelengths, involving a selective interruption of the transmitted signal,
   means for establishing a time gate whose duration is proportional to distance by comparing a count of the transmitted frequency after division by a predetermined integral number, with the count of the number of half wavelengths,
   means for applying the time gate to a stable oscillator having a predetermined frequency, thus to obtain a count representative of the distance between the two aforementioned locations, and
   means for directly displaying the distance count in the desired dimensions.

* * * * *